US012645546B2

(12) United States Patent
Zhang et al.

(10) Patent No.: US 12,645,546 B2
(45) Date of Patent: Jun. 2, 2026

(54) METHOD AND ELECTRONIC DEVICE FOR BACKING UP DATA AND RECOVERING DATA

(71) Applicant: DELL PRODUCTS L.P., Round Rock, TX (US)

(72) Inventors: Weibing Zhang, Beijing (CN); Huan Chen, Beijing (CN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/678,700

(22) Filed: May 30, 2024

(65) Prior Publication Data

US 2025/0335313 A1    Oct. 30, 2025

(51) Int. Cl.
*G06F 17/30* (2006.01)
*G06F 11/1446* (2026.01)

(52) U.S. Cl.
CPC ...... *G06F 11/1469* (2013.01); *G06F 11/1464* (2013.01); *G06F 2201/84* (2013.01)

(58) Field of Classification Search
CPC ........ G06F 16/13; G06F 16/24; G06F 16/156; G06F 3/1297; G06N 3/00; G06N 5/00; G05B 13/00; H03M 7/30; H04N 9/8042; G06T 9/00
See application file for complete search history.

(56) References Cited

U.S. PATENT DOCUMENTS

| | | | | |
|---|---|---|---|---|
| 9,323,655 | B1 * | 4/2016 | Sahin ..................... | G06F 3/0685 |
| 9,378,088 | B1 * | 6/2016 | Piszczek ............. | G06F 11/1008 |
| 10,579,281 | B2 * | 3/2020 | Cherubini ............. | G06F 3/0685 |
| 10,671,309 | B1 * | 6/2020 | Glynn ................... | G06F 3/0683 |
| 11,740,977 | B2 * | 8/2023 | Katiyar .............. | G06F 11/1464 |
| | | | | 711/162 |
| 12,079,125 | B2 * | 9/2024 | Thomasson ........... | G06F 3/0679 |
| 12,197,292 | B2 * | 1/2025 | Chen ..................... | G06F 16/215 |
| 2021/0365324 | A1 * | 11/2021 | Wang ................. | G06F 11/3419 |
| 2022/0245034 | A1 * | 8/2022 | Nara ................... | G06F 11/1469 |
| 2023/0118994 | A1 * | 4/2023 | Zhang .................. | G06F 3/0604 |
| | | | | 711/117 |
| 2023/0168970 | A1 * | 6/2023 | Pradhan .............. | G06F 11/1461 |
| | | | | 707/654 |
| 2024/0111743 | A1 * | 4/2024 | Lewis .................. | G06F 16/214 |
| 2024/0232140 | A1 * | 7/2024 | Kaur ..................... | G06F 16/185 |
| 2024/0386097 | A1 * | 11/2024 | Eda ........................ | G06F 21/552 |
| 2025/0004668 | A1 * | 1/2025 | Roberts ................. | G06F 3/0604 |

* cited by examiner

*Primary Examiner* — Hung D Le

(74) *Attorney, Agent, or Firm* — WOMBLE BOND DICKINSON (US) LLP

(57) ABSTRACT

A method for backing up data includes: determining a storage tier for storing the data; determining a data access frequency of the data, where the data access frequency indicates a frequency at which the data is accessed; and taking information of the storage tier and the data access frequency of the data as metadata, and sending the metadata and the data to a backup server. By sending the information including the storage tier for storing the data and the data access frequency as the metadata to the backup server, the computing device is enabled to recover the data by using the information in the metadata during the data recovery process, so that the data tiering layout can be maintained in the storage region to maintain the storage service performance, and thus a seamless storage service is provided to improve the user experience.

20 Claims, 9 Drawing Sheets

500

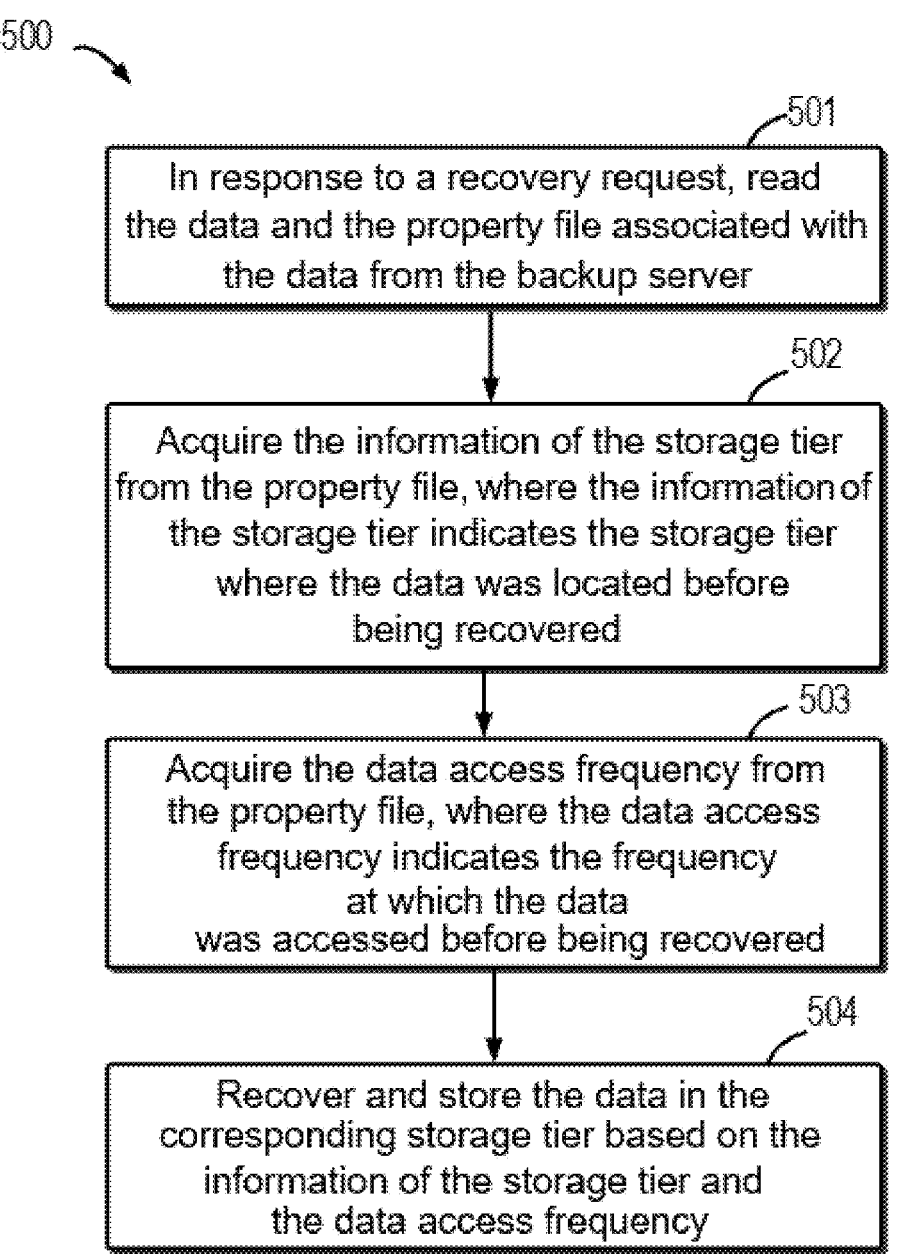

501

In response to a recovery request, read the data and the property file associated with the data from the backup server

502

Acquire the information of the storage tier from the property file, where the information of the storage tier indicates the storage tier where the data was located before being recovered

503

Acquire the data access frequency from the property file, where the data access frequency indicates the frequency at which the data was accessed before being recovered

504

Recover and store the data in the corresponding storage tier based on the information of the storage tier and the data access frequency

FIG. 5

METHOD AND ELECTRONIC DEVICE FOR BACKING UP DATA AND RECOVERING DATA

CROSS-REFERENCE TO RELATED APPLICATION

This patent application claims priority, under 35 U.S.C. § 119, of Chinese Patent Application No. 202410516965.X, filed Apr. 26, 2024, which is incorporated by reference in its entirety.

TECHNICAL FIELD

Embodiments of the present disclosure relate to the technical field of storage, and more specifically, to a method and an electronic device for backing up data and recovering data.

BACKGROUND

In a storage system, data is usually stored in tiers according to the frequency at which the data is accessed (also called data access activity temperature) through automatic tiering technology. For example, the storage system can place frequently accessed data in a high-performance storage disk, and infrequently accessed data in a low-performance storage disk, thus ensuring that a cost-effective storage system can be realized in the condition of a controllable budget for a user.

SUMMARY OF THE INVENTION

Embodiments of the present disclosure provide a method, an electronic device, and a computer program product for backing up data and recovering data.

According to a first aspect of the present disclosure, a method for backing up data is provided. The method includes: determining a storage tier for storing the data; determining a data access frequency of the data, where the data access frequency indicates a frequency at which the data is accessed; and taking information of the storage tier and the data access frequency of the data as metadata, and sending the metadata and the data to a backup server.

According to a second aspect of the present disclosure, an electronic device is provided. The electronic device includes at least one processor; and a memory coupled to the at least one processor and having instructions stored thereon, the instructions, when executed by the at least one processor, causing the electronic device to: determine a storage tier for storing data; determine a data access frequency of the data, where the data access frequency indicates a frequency at which the data is accessed; and take information of the storage tier and the data access frequency of the data as metadata, and send the metadata and the data to a backup server.

According to a third aspect of the present disclosure, a computer program product is provided. The computer program product is tangibly stored on a non-volatile computer-readable medium and includes machine-executable instructions, the machine-executable instructions, when executed, causing a machine to perform steps of the method in the first aspect of the present disclosure.

According to a fourth aspect of the present disclosure, a method for recovering data is provided. The method includes: in response to a recovery request, reading the data and a property file associated with the data from a backup server; acquiring information of a storage tier from the property file, the information of the storage tier indicating the storage tier where the data was located before being recovered; acquiring a data access frequency from the property file, the data access frequency value indicating a frequency at which the data was accessed before being recovered; and recovering and storing the data in a corresponding storage tier based on the information of the storage tier and the data access frequency.

According to a fifth aspect of the present disclosure, an electronic device is provided. The electronic device includes at least one processor; and a memory coupled to the at least one processor and having instructions stored thereon, the instructions, when executed by the at least one processor, causing the electronic device to: in response to a recovery request, read data and a property file associated with the data from a backup server; acquire information of a storage tier from the property file, the information of the storage tier indicating the storage tier where the data was located before being recovered; acquire a data access frequency from the property file, the data access frequency value indicating a frequency at which the data was accessed before being recovered; and recover and store the data in a corresponding storage tier based on the information of the storage tier and the data access frequency.

According to a sixth aspect of the present disclosure, a computer program product is provided. The computer program product is tangibly stored on a non-volatile computer-readable medium and includes machine-executable instructions, the machine-executable instructions, when executed, causing a machine to perform steps of the method in the fourth aspect of the present disclosure.

BRIEF DESCRIPTION OF THE DRAWINGS

The above and other objects, features, and advantages of the present disclosure will become more apparent from description of exemplary embodiments of the present disclosure in further detail with reference to the accompanying drawings. In exemplary embodiments of the present disclosure, the same reference numerals generally represent the same components.

FIG. 5 illustrates a flow chart of a method for recovering data according to an embodiment of the present disclosure;

In various accompanying drawings, identical or corresponding reference numerals represent identical or corresponding parts.

DETAILED DESCRIPTION

Figure 1:
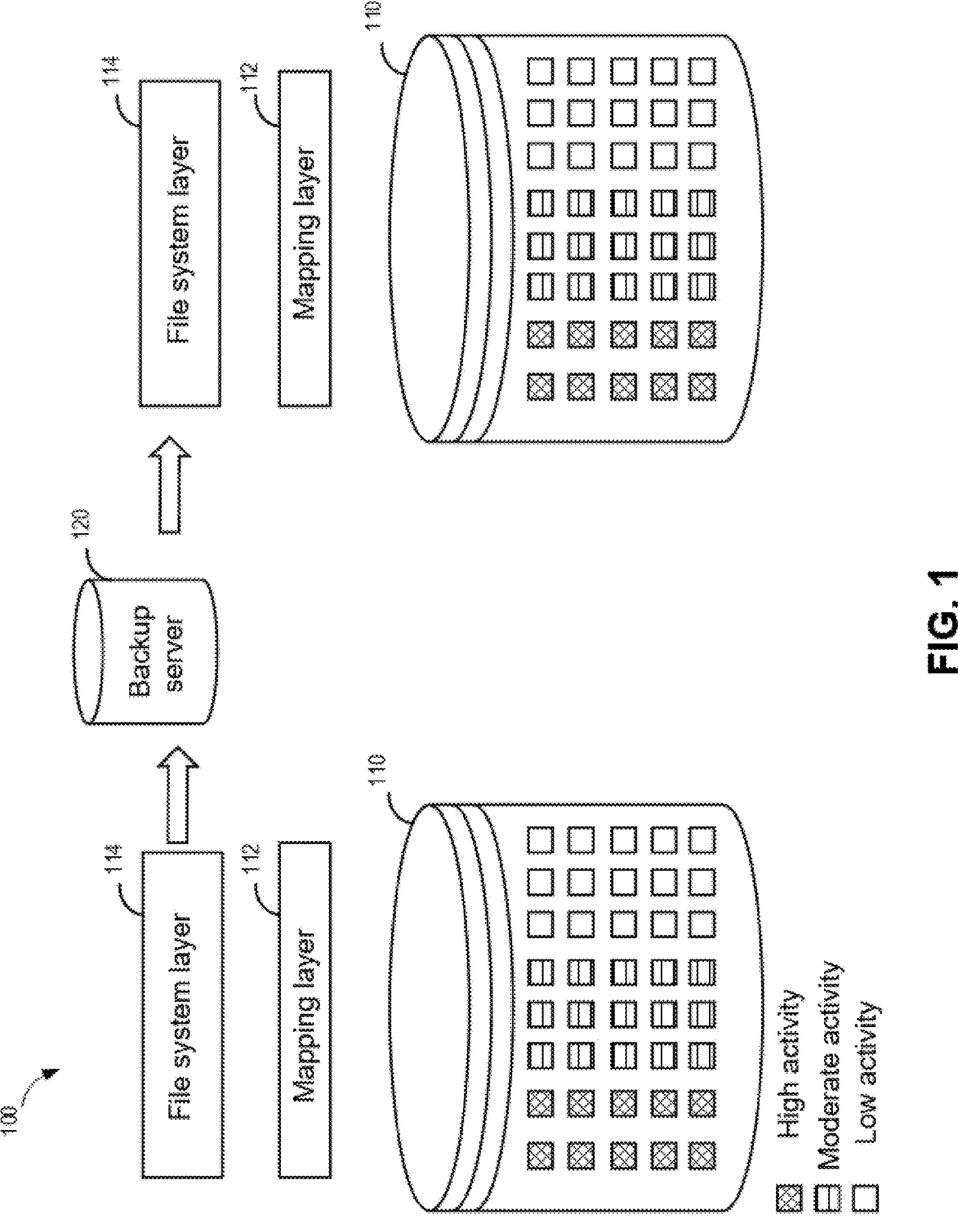
FIG. 1 illustrates a schematic diagram of an example environment in which data backup and data recovery can be implemented.

The embodiments of the present disclosure will be described below in further detail with reference to the accompanying drawings. Although the accompanying drawings show some embodiments of the present disclosure, it should be understood that the present disclosure can be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the scope of protection of the present disclosure.

In the description of the embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

The current tiering storage technology can place data in storage disks with different performance according to the frequency at which the data is accessed. For example, the storage system can assign a higher access activity temperature (hereinafter briefly referred to as "temperature") to a data storage region with a higher access frequency, and the storage system can assign a lower temperature to a data storage region with a lower access frequency. In other words, "temperature" can be used to characterize the frequency at which the data or the storage region is accessed. The storage system uses configuration information and temperature to assign the data storage region with a higher temperature to the storage disk with a higher performance, so as to obtain faster response time.

Data tiering operates in the blocks and layers in the storage system, but the file system layer that saves user files does not know the location of block-level data in different layers. As both data backup and data recovery are performed at the file level, there is no distinction between high activity data and low activity data (i.e., cold data) in the process of data backup and recovery. This leads to the lack of information about the data distribution in previous tiering results when backing up and recovering data. When data recovery is required, users may wish to maintain the data tiering layout with the same tiering strategy so as to continue to gain performance and cost advantages. However, in the current process of data backup and data recovery, high activity data (i.e., hot data) and cold data are usually mixed in different data layers, which leads to degraded storage performance of the same application. Moreover, it is necessary to re-evaluate the data according to the access activity temperature, which usually takes a long time because it involves a great amount of data block relocation. At the same time, the relocation of data blocks increases the wear of the storage disk. Therefore, it is desirable to provide a method for data backup and data recovery, so that when recovering data, the data tiering layout can be maintained to maintain the performance of the storage service, and the wear of the storage disk can also be reduced.

Therefore, at least to solve the above problems and other potential problems, embodiments of the present disclosure propose a method for backing up data. The method includes: determining a storage tier for storing the data; determining a data access frequency of the data, where the data access frequency indicates a frequency at which the data is accessed; and taking information of the storage tier and the data access frequency of the data as metadata, and sending the metadata and the data to a backup server.

According to the method for backing up data according to the embodiment of the present disclosure, by sending the information including the storage tier storing the data and the data access frequency to the backup server, the computing device is enabled to recover the data by using the information such as the tiering property and the access frequency in the metadata in the process of performing the data recovery, so that the data tiering layout can be maintained in the main storage region after the data recovery to maintain the storage service performance, and thus a seamless storage service can be provided to improve the user experience.

FIG. 1 illustrates a schematic diagram of an example environment in which data backup and data recovery can be implemented. In the example environment illustrated in FIG. 1, a storage system 100 capable of implementing data backup and data recovery is shown. The storage system 100 may include a main storage region 110 for storing original data (it can be understood that the "original" described here is relative to the recovered data). In the main storage region 110, the data is stored in tiers according to the access frequency. For example, as shown in FIG. 1, high activity data is stored in a first storage tier corresponding to a high-performance storage disk. In some embodiments, the first storage tier includes a flash memory. Moderate activity data is stored in a second storage tier corresponding to a moderate-performance storage disk. In some embodiments, the second storage tier includes a serial attached SCSI (SAS) storage disk. Low activity data is stored in a third storage tier corresponding to a low-performance storage disk. In some embodiments, the third storage tier includes an NL-SAS storage disk.

In some embodiments, the storage system 100 in FIG. 1 may further include a file system layer 114 and a mapping layer 112. The file system layer 114 can specify the size of the data block, and the file system layer 114 can divide the file into logical blocks according to the sizes of the data blocks in the file and the size of the file. The storage system 100 can assign physical blocks for these logical blocks, and realize the mapping between the logical blocks and the physical blocks through the mapping layer 112.

The storage system 100 in FIG. 1 may further include a backup server 120 configured to back up the data in the main storage region 110. The data can be backed up in the backup server 120. Moreover, when it is necessary to recover the data in the main storage region 110, the computing device (not shown; or a control device) in the storage system 100 can acquire the data from the backup server 120 and recover and store the data in the main storage region 110. It can be understood that although they are the same main storage region, in order to distinguish the main storage region before data recovery from the main storage region after data recovery, the main storage region before data recovery is marked with the reference numeral 110, and the main storage region after data recovery is marked with the reference numeral 110' in FIG. 1.

In some embodiments, when backing up the data, the computing device of the storage system 100 can determine the storage tier for storing the data. The computing device can also determine the data access frequency of the data, where the data access frequency indicates the frequency at which the data is accessed. The computing device can also take the information of the storage tier and the data access frequency of the data as metadata and send the metadata and the data to the backup server 120.

In the process of data recovery, the computing device can read the data and the property file associated with the data from the backup server 120 in response to a recovery request. The computing device can acquire the information of the storage tier from the property file, where the information of the storage tier indicates the storage tier where the data was located before being recovered. The computing device can acquire the data access frequency from the property file, where the data access frequency indicates the frequency at which the data was accessed before being recovered. The computing device can also recover and store the data in the corresponding storage tier based on the information of the storage tier and the data access frequency.

Further, it can be understood that the computing device of the storage system 100 may include, but is not limited to, a personal computer, a server computer, a handheld or laptop device, a mobile device (such as a mobile phone, a personal digital assistant (PDA), and a media player), a multi-processor system, a consumer electronic product, a wearable electronic device, an intelligent home device, a minicomputer, a mainframe computer, an edge computing device, a distributed computing environment including any of the above systems or devices, and the like.

According to the data backup and recovery method of the embodiments of the present disclosure, the data tiering layout can be maintained in the main storage region after the data is recovered to maintain the performance of the storage service, so that a seamless storage service can be provided to improve the user experience. In addition, by adopting the data backup and recovery method of the embodiments of the present disclosure, wear of the storage disk can also be reduced.

Figure 2:
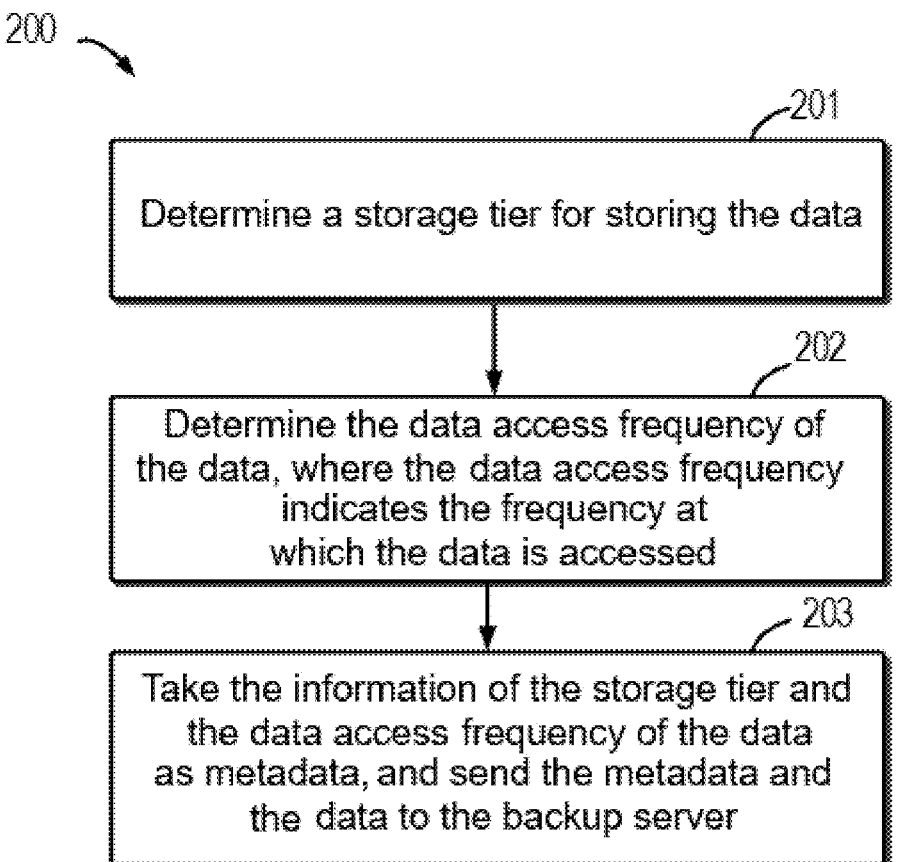
FIG. 2 illustrates a flow chart of a method for backing up data according to an embodiment of the present disclosure.

A flow chart of a method 200 for backing up data according to an embodiment of the present disclosure will be described below with reference to FIG. 2. FIG. 2 illustrates a flow chart of a method for backing up data according to an embodiment of the present disclosure. The method 200 may be performed at the computing device of the storage system 100 in FIG. 1 or at any suitable computing device. It should be understood that the numbering in the flow chart of the method 200 does not indicate the order in which these steps are performed. Some or all of these steps may be performed in parallel, or the performing orders may be exchanged with each other, which is not limited in the present disclosure. Moreover, the method 200 in FIG. 2 may further include additional steps that are not shown and/or may omit steps that are shown, and the scope of the present disclosure is not limited in this respect.

At block 201, the computing device can determine a storage tier for storing the data (e.g., the data to be backed up). In some embodiments, the storage tier may include storage disks arranged in tiers according to their performance. For example, the storage system can set a high-performance storage disk as a first storage tier, a moderate-performance storage disk as a second storage tier, and a low-performance storage disk as a third storage tier. In some embodiments, the third storage tier includes an NL-SAS storage disk. In some embodiments, the first storage tier includes a flash memory, the second storage tier includes a serial attached SAS storage disk, and the third storage tier includes an NL-SAS storage disk.

The storage tiers arranged through tiering in the storage system 100 can store corresponding data. In some embodiments, the storage system 100 can store the data in a corresponding storage tier according to the frequency at which the data is accessed. The frequency at which the data is accessed can also be characterized as the activity of the data, and accordingly, the storage system 100 can store the data in the corresponding storage tier according to the activity of the data. For example, as illustrated in FIG. 1, high activity data is stored in a first storage tier, moderate activity data is stored in a second storage tier, and low activity data is stored in a third storage tier.

The computing device can determine the storage tier where the data to be backed up is located. For example, the data to be backed up is represented as Data1 and is stored in the first storage tier L1. Accordingly, the computing device can determine that the storage tier where the data to be backed up Data1 is located is L1.

At block 202, the computing device can determine the data access frequency of the data (e.g., the data to be backed up), and the data access frequency can indicate the frequency at which the data is accessed. In some embodiments, the data to be backed up can be stored in a corresponding storage region. In some embodiments, the storage region may include a stripe, and the stripe may correspond to a storage tier where the data to be backed up is stored. For example, assuming that the data to be backed up is stored in the first storage tier L1, the storage region of the data to be backed up may be a stripe corresponding to the first storage tier L1.

Figure 3:
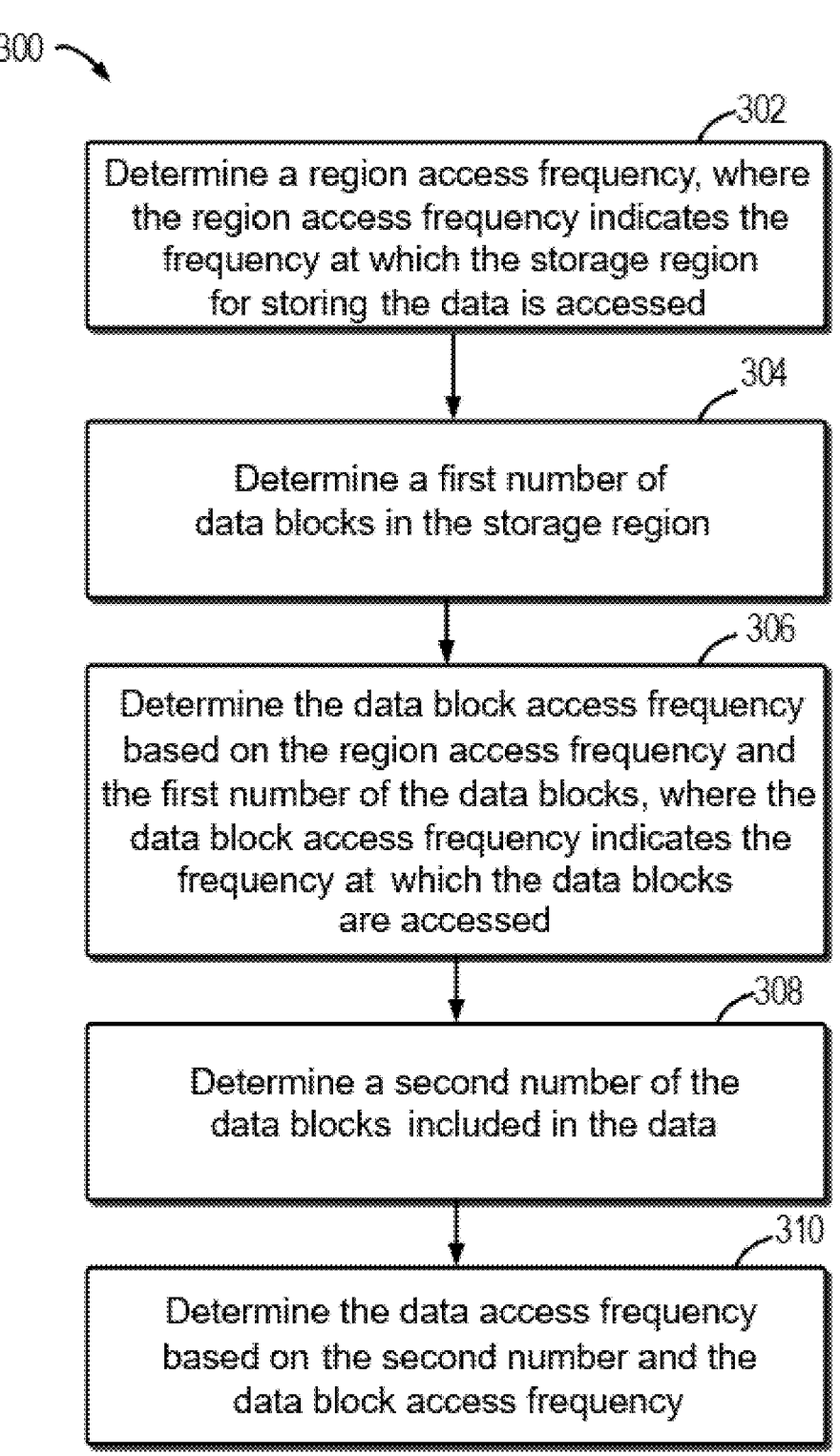
FIG. 3 illustrates a flow chart of a method for determining a data access frequency according to an embodiment of the present disclosure.

The process of determining the data access frequency will be described below with reference to FIG. 3. FIG. 3 illustrates a flow chart of a method for determining the data access frequency according to an embodiment of the present disclosure. In some embodiments, at block 302, the computing device can determine a region access frequency, where the region access frequency can indicate the frequency at which the storage region storing the data is accessed. Taking the storage region being a stripe as an example, the computing device can acquire the region access frequency corresponding to the stripe where the data is located. In some embodiments, "temperature" or "activity temperature" can be used to characterize the frequency at which the data or the storage region is accessed. In some embodiments, the computing device can use the configuration information and input/output statistical information of the storage system to calculate the activity temperature of the storage system, and assign an appropriate activity temperature to the corresponding storage region according to the frequency at which each storage region (e.g., stripe) is accessed. For example, a region that is accessed relatively frequently can be assigned a higher temperature, and a region that is accessed relatively infrequently can be assigned a lower temperature.

At block 304, the computing device can determine a first number of data blocks in the storage region storing the data to be backed up. At block 306, the computing device can determine the data block access frequency based on the region access frequency and the first number of the data blocks. In some embodiments, the data block access frequency can indicate the frequency at which the data blocks in the storage region are accessed. For example, the computing device can determine the data block access frequency by dividing the region access frequency by the first number of the data blocks.

At block 308, the computing device can determine a second number of data blocks included in the data. In some embodiments, the data to be backed up can include a file with multiple data blocks therein, and the computing device can determine the second number of the data blocks included in the data. At block 310, the computing device can determine the data access frequency based on the second number and the data block access frequency. For example, the computing device can multiply the data block access frequency by the second number (or add the second number of data block access frequencies) to determine the data access frequency.

Returning to FIG. 2, at block 203, the computing device can take the information of the storage tier and the data access frequency of the data as metadata, and send the metadata and the data to the backup server. By sending the information including the storage tier storing the data and the data access frequency to the backup server, the computing device is enabled to recover the data by using the information such as the tiering property and the access frequency in the metadata in the process of performing the data recovery, so that the data tiering layout can be maintained in the main storage region after the data recovery to maintain the storage service performance, and thus a seamless storage service can be provided to improve the user experience.

Figure 4:
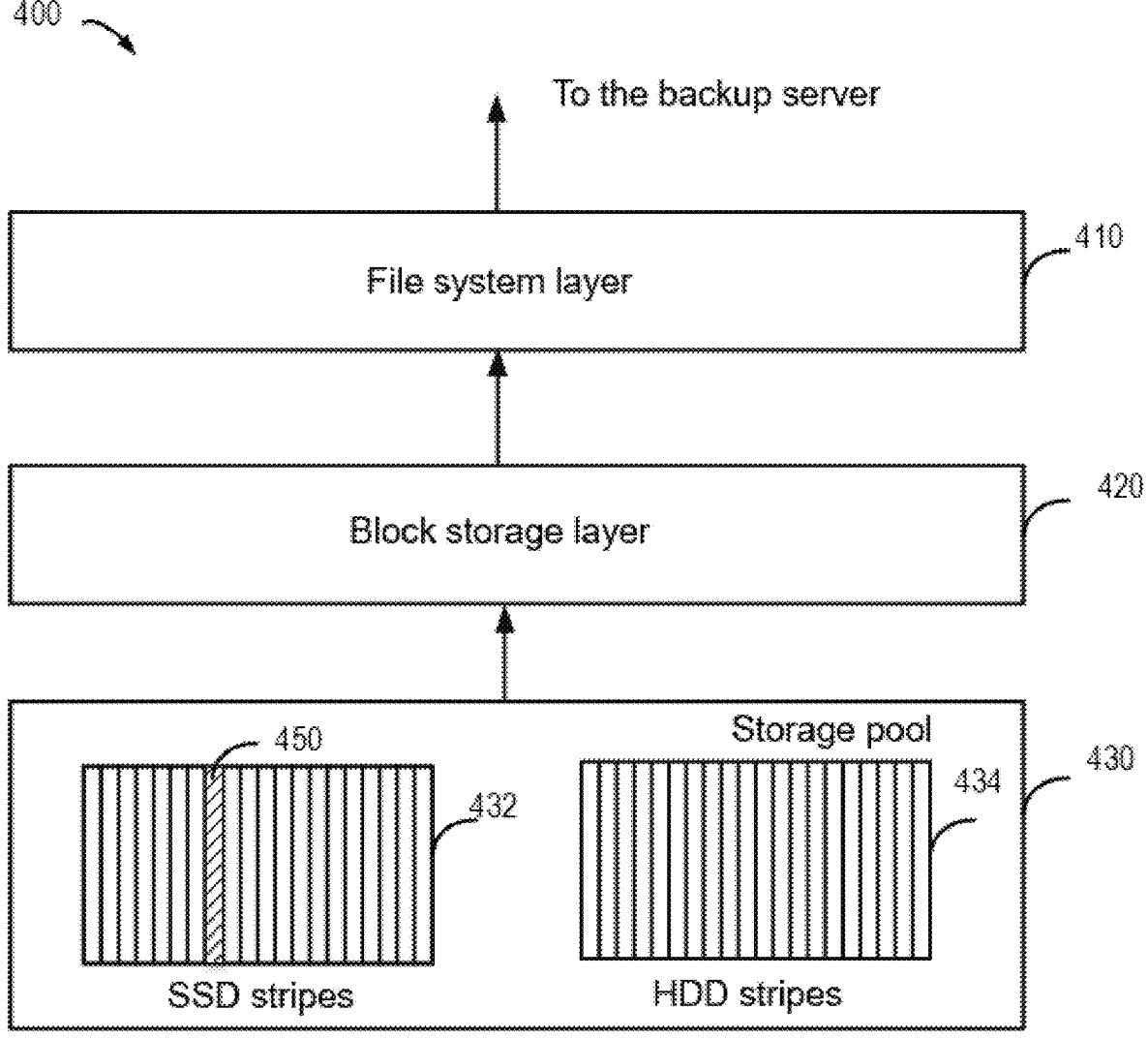
FIG. 4 illustrates a diagram of an exemplary process of backing up data according to an embodiment of the present disclosure.

FIG. 4 illustrates a diagram 400 of an exemplary process of backing up data according to an embodiment of the present disclosure. The storage pool 430 shown in FIG. 4 schematically includes stripes corresponding to two storage tiers, for example, SSD stripes 432 and HDD stripes 434. Take a stripe 450 among the SSD stripes 432 where the data to be backed up is stored as an example.

After determining the stripe where the data to be backed up is located, the computing device can further determine the region access frequency of the stripe 450. In some embodiments, the computing device can represent the access frequency as the activity temperature, and accordingly, the calculation process for the access frequency will be schematically represented by "temperature" in the following formula.

In some embodiments, the computing device can represent the region access frequency as $\text{Temperature}_{Region}$. The computing device can further determine a first number of data blocks in the stripe 450, block_count_in_region. The computing device can determine the data block access frequency $TPB_i$ based on Formula (1).

$$TPB_i = \frac{\text{Temperature}_{Region}}{\text{block\_count\_in\_region}} \qquad \text{Formula (1)}$$

The computing device can further determine the number n of data blocks included in the data to be backed up, and determine the data access frequency according to the number of data blocks and the data block access frequency. For example, the computing device can determine the data access frequency according to Formula (2).

$$\text{Temperature} = \sum_{i=0}^{n} TPB_i \qquad \text{Formula (2)}$$

where i represents the count of each data block in the data.

In some embodiments, the data to be backed up may include a file, and accordingly, the data obtained through calculation by Formula (2) is the activity temperature of the file.

The computing device can acquire the storage tier information of the data stored in the stripe 450 among the SSD stripes 432, and determine the data access frequency corresponding to the data through the above Formulas (1) and (2). The storage tier information and the data access frequency can be used as metadata of the data and sent to the block storage layer 420 together with the data. In the block storage layer 420, the block storage layer 420 can process the data and the metadata to form them into a data packet. The data packet is further sent to the file system layer 410, and the file system layer 410 can set the metadata in the property file.

In some embodiments, the storage tier information in the metadata can be represented as bit values in the property file, such as [0, 1, 2], where 0 can represent the first storage tier, 1 can represent the second storage tier, and 2 can represent the third storage tier. It can be understood that the above description is only schematic, and those skilled in the art can represent the storage tier in any suitable way. Further, the information of the storage tier and the data access frequency are both associated with the identifier of the data to be backed up. Therefore, based on the identifier of the data to be backed up, the information of the storage tier and the data access frequency corresponding to the data can be determined from the property file.

After setting the property file, the file system layer can send the property file and the data to be backed up to the backup server together as backup data that is used for data recovery in the process of data recovery.

A data recovery process according to an embodiment of the present disclosure will be described below with reference to FIG. 5. FIG. 5 illustrates a flow chart of a method for recovering data according to an embodiment of the present disclosure. The method 500 may be performed at the computing device of the storage system 100 in FIG. 1 or at any suitable computing device. It should be understood that the numbering in the flow chart of the method 500 does not indicate the order in which these steps are performed. Some or all of these steps may be performed in parallel, or the performing orders may be exchanged with each other, which is not limited in the present disclosure. Moreover, the method 500 in FIG. 5 may further include additional steps that are not shown and/or may omit steps that are shown, and the scope of the present disclosure is not limited in this respect.

At block 501, the computing device can read the data to be recovered and the property file associated with the data to be recovered from the backup server 120 in response to a recovery request. For example, when the storage system encounters a virus attack or some other events, data needs to be recovered, and the computing device can receive a recovery request for recovering the data. In some embodiments, the recovery request may include a recovery request for the data Data A (e.g., file A). In some embodiments, the recovery request may include a recovery request for all or part of the data in the main storage region 110. The computing device can read the data and the property file associated with the data from the backup server in response to the recovery request.

At block 502, the computing device can acquire the information of the storage tier from the property file, where the information of the storage tier indicates the storage tier where the data to be recovered was located before being recovered. As described above, the property file may include the information of the storage tier of the data (i.e., the information of the storage tier where the data was stored when it was backed up). In some embodiments, as described above, the information of the storage tier can be represented by bit values, and the information of the storage tier is associated with the identifier of the data to be recovered.

In some embodiments, the storage liter where the data was stored before the data is recovered is associated with the frequency at which the data is accessed. For example, as described above, the storage system 100 can store the data in the corresponding storage tier according to the frequency at which the data is accessed. In some embodiments, the frequency at which the data is accessed can be characterized as the activity of the data, and accordingly, the storage system 100 can store the data in the corresponding storage tier according to the activity of the data. For example, as illustrated in FIG. 1, high activity data is stored in a first storage tier, moderate activity data is stored in a second storage tier, and low activity data is stored in a third storage tier.

At block 503, the computing device can acquire the data access frequency from the property file, where the data access frequency indicates the frequency at which the data to be recovered was accessed before being recovered. In some embodiments, the property file may include the data access frequency of the data to be recovered. The data access frequency may be associated with the identifier of the data to be recovered and may indicate the frequency at which the data is accessed when it is backed up. In some embodiments, the data access frequency can be characterized by using the activity temperature.

At block 504, the computing device can recover and store the data in the corresponding storage tier based on the information of the storage tier and the data access frequency.

Therefore, by using the information of the storage tier and the data access frequency in the property file, the data to be recovered can be written into the corresponding storage tier according to the previous strategy of storage tiering layout, so that the storage service performance can be maintained while maintaining the data tiering layout in the main storage region, and thus a seamless storage service can be provided to improve the user experience. In addition, the wear of the storage disk is also significantly reduced.

The specific implementation process in which the computing device recovers and stores the data in the corresponding storage tier based on the information of the storage tier and the data access frequency will be described below in detail. In some embodiments, the computing device can determine the data block access frequency associated with the data to be recovered. For example, the computing device can determine the data block access frequency associated with the data to be recovered based on the data access frequency acquired from the property file and the first number of the data blocks in the data to be recovered. For example, when the frequency at which the data is accessed is characterized by the activity temperature, the data block access frequency can be calculated by the following Formula (3).

$$TPB_i = \frac{\text{Temperature}}{\text{block\_count\_in\_data}} \qquad \text{Formula (3)}$$

where Temperature represents the data access frequency acquired from the property file, and block_count_in-_data represents the first number of the data blocks in the data.

In some embodiments, the computing device can determine the storage tier where the data is stored when it is backed up based on the information of the storage tier acquired from the property file. In addition, the computing device can determine the storage tier for storing the data in the main storage region before the data is recovered according to the information of the storage tier from all the property files in the backup server. Thus, the computing device can determine the storage tier utilized in the previous tiering storage layout. For example, the computing device can determine that data A is stored in the first storage tier according to the storage tier information acquired from the first property file, data B is stored in the second storage tier according to the storage tier information in the second property file, and data C is stored in the third storage tier according to the storage tier information in the third property file, so that the computing device can determine that the previous storage layout includes the first storage tier, the second storage tier, and the third storage tier. Moreover, according to the descending order of the storage performance, the computing device can sort the determined storage tiers, such as the first storage tier, the second storage tier, and the third storage tier.

The computing device can determine the data block access frequency $T_A$ of the data to be recovered A, such as through calculation according to the above Formula (3). Moreover, the computing device can calculate the data block access frequency associated with each item of all the data to be recovered according to the data access frequencies in all the property files from the backup server. The computing device sorts all the calculated data block access frequencies, that is, the computing device sorts the data block access frequency of the data to be recovered among multiple data block access frequencies respectively associated with all the data to be recovered. For example, the data block access frequencies are sorted in descending order. For example, taking k items of data to be recovered as an example, in which the first item of data includes n data blocks, the second item of data includes u data blocks, the d-th item of data includes q data blocks, and the k-th item of data includes p data blocks, the sorting result can be expressed as: $T_{01}, T_{02}, T_{0n}; T_{11}, T_{12}, \ldots, T_{1u}; T_{d1}, T_{d2}, \ldots, T_{dq}; \ldots;$ $T_{k1}, T_{k2}, \ldots, T_{kp}$.

The computing device can divide the sorting of data block access frequencies into different storage tiers based on the sorting of data block access frequencies in descending order, and according to the performance of the storage tier that is determined for recovering and writing and the number of data blocks that can be written in the corresponding storage tier. For example, the storage tiers sorted in descending order of performance are: a first storage tier, a second storage tier, and a third storage tier. Based on the number of the data blocks that can be stored in each storage tier, the computing device can divide the sorting of data block access frequencies into different storage tiers, so as to determine the storage tiers where different data can be written, thereby maintaining the data tiering layout while keeping the continuity of data writing.

For example, taking the sorting of data block access frequencies in the above example as an example, after dividing according to the performance of the storage tiers, the result can be: $\{T_{01}, T_{02}, \ldots, T_{0n}; T_{11}, T_{12}, \ldots$ $T_{1u}; \ldots \}, \{T_{d1}, T_{d2}, \ldots, T_{dq}; \ldots;\}, \{ \ldots T_{k1},$ $T_{k2}, \ldots, T_{kp}\}$. That is, multiple items of data, such as the first item of data and the second item of data, can be written into the first storage tier, multiple items of data, such as the d-th item of data, can be written into the second storage tier, and multiple items of data, such as the k-th item of data, can be written into the third storage tier.

In addition, although in the above examples, sorting is done according to the descending order of the storage tier performance and the descending order of the data block access frequencies, those skilled in the art can understand that sorting can also be done according to the ascending order of the storage tier performance and the ascending order of the data block access frequencies, so as to realize the storage of data blocks in different storage tiers.

In some embodiments, the computing device can further determine the activity temperature in the storage region after the data is recovered, which characterizes the frequency at which the storage region storing the data is accessed. In some embodiments, the recovered data may be stored in a stripe, and accordingly, the storage region may include a stripe. Also, in some embodiments, the stripe storing the data corresponds to the corresponding storage tier where the data is written.

When determining the region access frequency, the computing device can determine the region access frequency of the storage region based on the data block access frequency of the data and the second number of the data blocks in the storage region where the data is written. When the frequency at which the storage region is accessed is characterized by the activity temperature, the region block access frequency can be calculated by the following Formula (4).

$$\text{Temperature}_{Region} = \sum_{j=0}^{m} TPB_j \qquad \text{Formula (4)}$$

where $\text{Temperature}_{Region}$ represents the region block access frequency, m represents the data of the data blocks stored in the storage region, and j represents each data block. In some embodiments, $TPB_j$ is equal when all the data blocks in the storage region are used for the same data. When the data blocks in the storage region are used for different data, the $TPB_j$ for the first data may be different from the $TPB_k$ for the second data.

Figure 6:
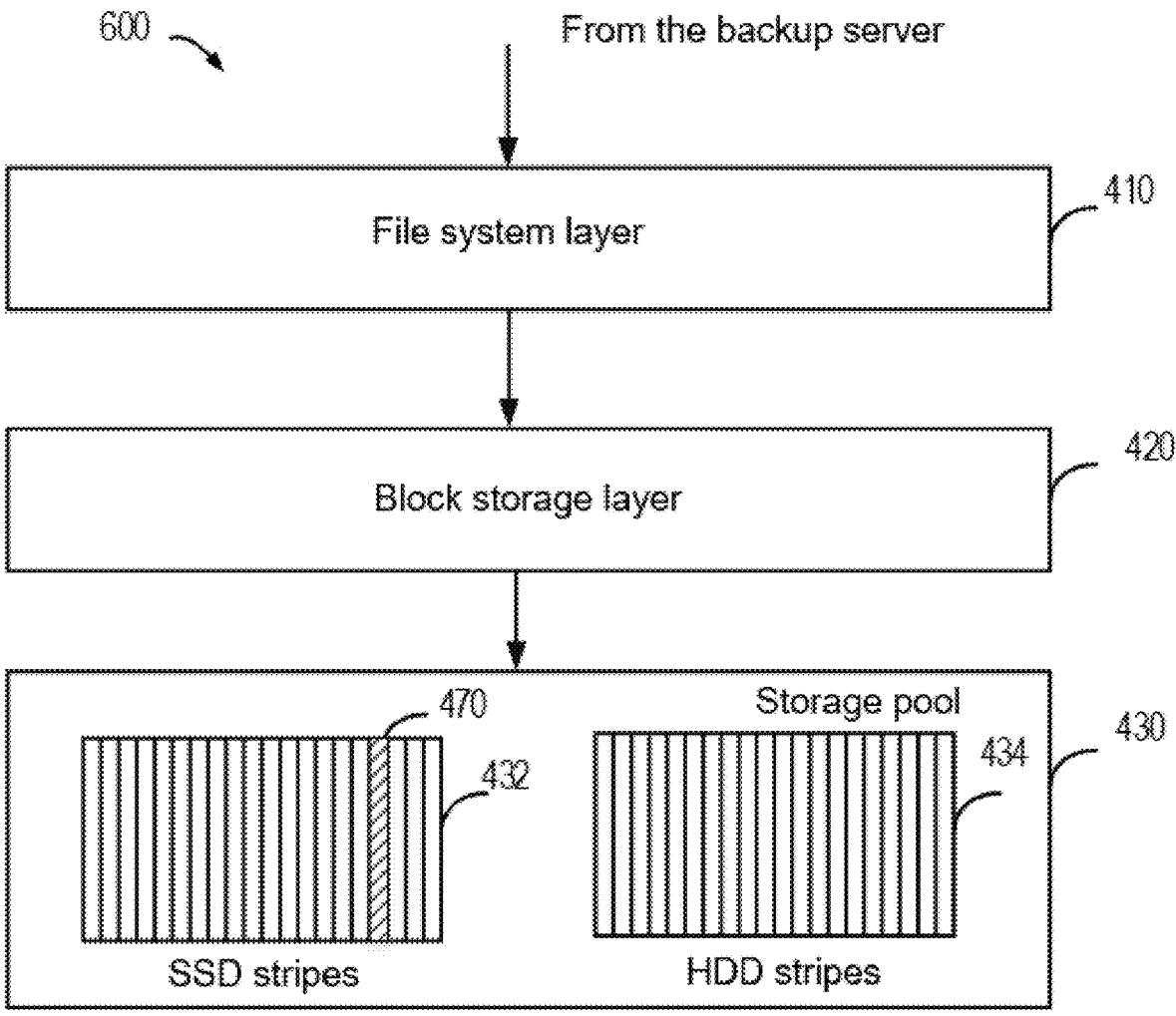
FIG. 6 illustrates a diagram of an exemplary process of recovering data according to an embodiment of the present disclosure.

FIG. 6 illustrates a diagram 600 of an exemplary process of recovering data according to an embodiment of the present disclosure. The process of recovering data in FIG. 6 can be regarded as the corresponding reverse process of the process of backing up data shown in FIG. 4. Accordingly, in FIG. 6, the same reference numerals as in FIG. 4 denote the same components, and the specific functions are similar to those in FIG. 4, and description thereof is not repeated here for the sake of brevity.

As shown in FIG. 6, in response to the recovery request, the computing device can acquire the data to be recovered and the property file associated with the data to be recovered from the backup server. The computing device can send the data and the property file to the file system layer 410 to convert the data and the property file associated with the data into a data packet via the file system layer 410. The converted data packet includes the data and the metadata, and the metadata includes the information of the storage tier and the data access frequency. The metadata can be understood in combination with the above description, and description thereof is not repeated here for the sake of brevity.

The computing device sends the data packet to the block storage layer 420, and the block storage layer 420 can acquire the metadata from the data block, and can store the data to be recovered in the stripe corresponding to the corresponding storage tier based on the information of the storage tier and the data access frequency in the acquired metadata. For example, as shown in FIG. 6, the data to be recovered is written into the stripe 470 among the SSD stripes 432.

In some embodiments, as the storage tier information and the access frequency information of the data are used in the process of recovering the data, the region where data is written after being recovered may be different from the region where it was located before being recovered. That is, the data was stored in the first region of the storage tier before being recovered, the computing device can recover and write the data into the second region of the storage tier based on the information of the storage tier and the data access frequency, and the second region is different from the first region. For example, as illustrated in FIG. 4, when the data is backed up, the data is stored in the stripe 450; and after being recovered, the data is written into the stripe 470.

Figure 7:
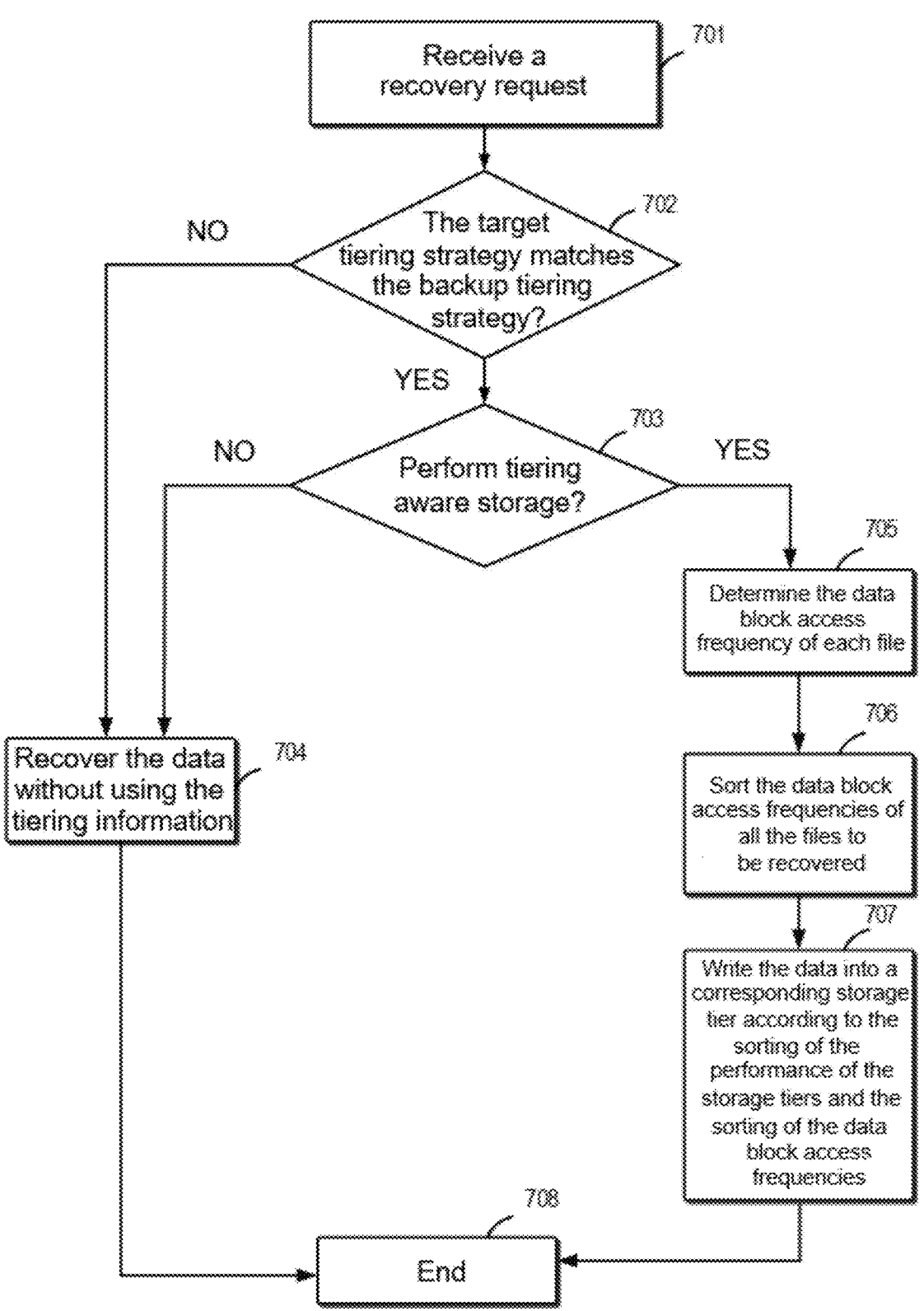
FIG. 7 illustrates a flow chart of a method for recovering data according to another embodiment of the present disclosure.

FIG. 7 illustrates a flow chart of a method for recovering data according to another embodiment of the present disclosure. The method 700 may be performed at the computing device of the storage system 100 in FIG. 1 or at any suitable computing device. It should be understood that the numbering in the flow chart of the method 700 does not indicate the order in which these steps are performed. Some or all of these steps may be performed in parallel, or the performing orders may be exchanged with each other, which is not limited in the present disclosure. Moreover, the method 700 in FIG. 7 may further include additional steps that are not shown and/or may omit steps that are shown, and the scope of the present disclosure is not limited in this respect.

At block 701, the computing device can receive a recovery request. In some embodiments, the recovery request may be a request to recover the data in the main storage region 110. The computing device determines at 702 whether the target tiering strategy matches the backup tiering strategy.

In some embodiments, the computing device can determine the tiering strategy adopted in the data recovery process. The computing device can match the tiering strategy adopted in the recovery process with the tiering strategy adopted in data backup. When a match is determined, the computing device determines in the operation 703 whether to perform tiering aware recovery. When it is determined to perform the tiering aware process, the computing device can proceed to 705 to determine the data block access frequency of each file of the files corresponding to the data to be recovered. The process of calculation of the data block access frequency can be understood in combination with the process described above, and description thereof will not be repeated here for the sake of brevity.

The computing device can further arrange the data block access frequencies of all the files to be recovered in the operation 706. For example, in the operation 706, the computing device can sort the data block access frequencies of all the files to be recovered in the descending order. Further, in the operation 707, the computing device can divide the sorted data block access frequencies into different storage tiers according to the sorting of the performance of the storage tiers. For example, the computing device can divide the data block access frequencies in the descending order into different storage tiers according to the descending order of the performance of the storage tiers, as described in detail above. That is, in the operation 707, the computing device can write the data into the corresponding storage tiers based on the sorting of the storage tiers and the data block access frequencies.

In addition, although in the above example, sorting is done according to the descending order of the storage tier performances and the descending order of the data block access frequencies, those skilled in the art can understand that sorting can be also done according to the ascending order of the storage tier performance and the ascending order of the data block access frequencies, so as to realize the storage of the data blocks in different storage tiers.

When the computing device determines that the target tiering strategy does not match the back-up tiering strategy in the operation 702, the computing device proceeds to the operation 704 and recovers the data without using the tiering information in the property file. In addition, when the computing device determines not to perform tiering aware storage in the operation 703, the computing device can also proceed to the operation 704 and recover the data without using the tiering information in the property file.

Figure 8:
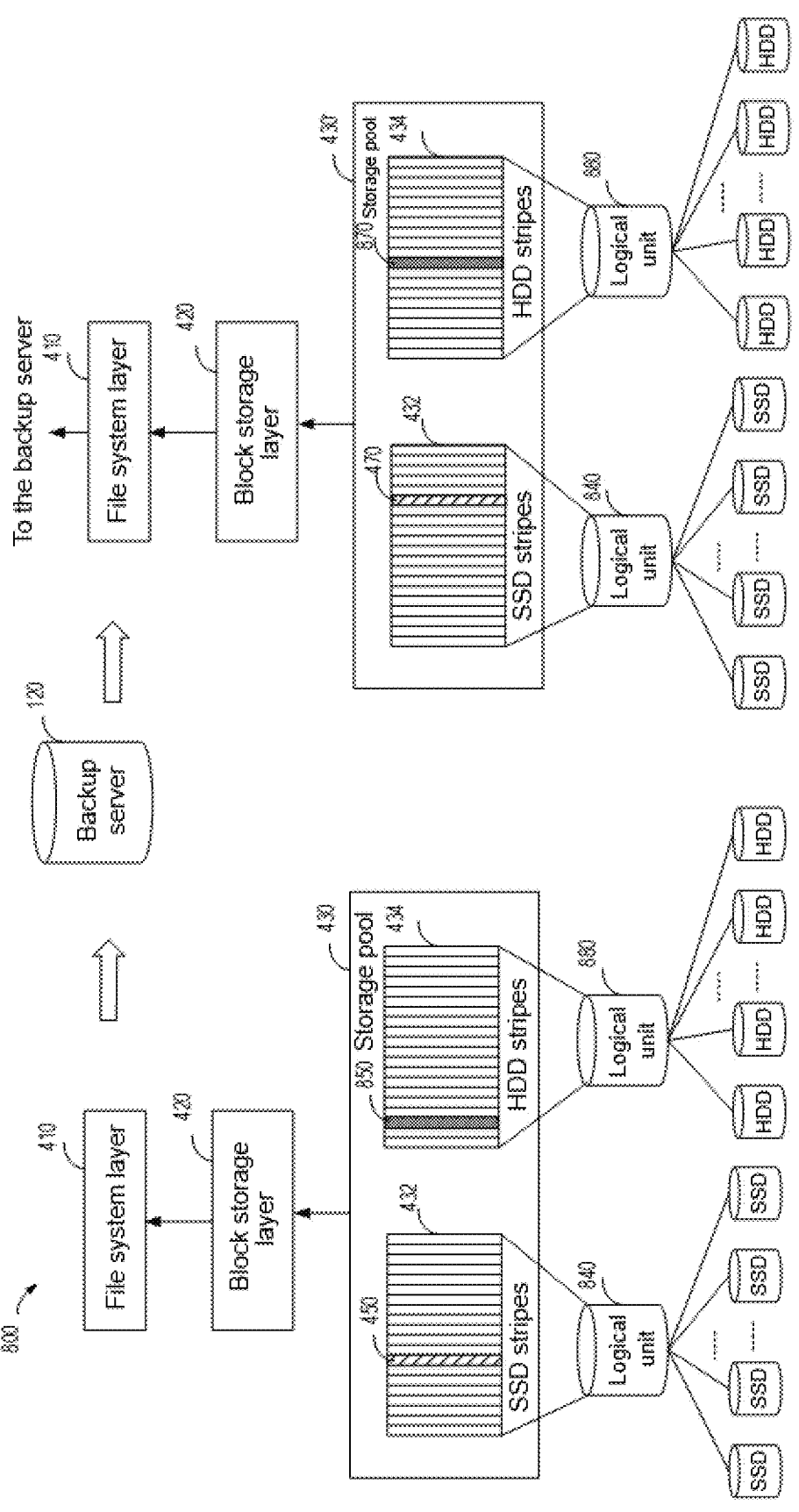
FIG. 8 illustrates a schematic diagram of a process of backing up and recovering data according to an embodiment of the present disclosure.

FIG. 8 illustrates a schematic diagram of an overall process of backing up and recovering data according to an embodiment of the present disclosure. In FIG. 8, description is made by taking the first storage tier including multiple SSDs and the second storage tier including multiple HDDs as an example. There is also a logical unit layer 840 between the SSD stripes 432 and the multiple SSDs, and there is also a logical unit layer 880 between the HDD stripes 434 and the multiple HDDs. The computing device of the storage system can back up the data in the backup server 120 by adopting the data backup method according to the embodiments of the present disclosure as described above, and can also recover data from the backup server 120 to the main storage region 430' by adopting the method of data recovery according to the embodiments of the present disclosure as described above.

As the information of the storage tier and the data access probability information are considered in the process of data recovery, the data stored in the first region during backup may be stored in a second region different from the first region when it is recovered. As shown in FIG. 8, the data stored in the stripe 450 during backup is stored in the stripe 470 after being recovered; and the data stored in the stripe 850 during backup is stored in the stripe 870 after being recovered. It can be understood that the above diagram is only schematic, and the data stored in the first region during backup may also be stored in the first region when it is recovered.

By sending the information including the storage tier storing the data and the data access frequency to the backup server, the computing device is enabled to recover the data by using the information such as the tiering property and the access frequency in the metadata in the process of performing the data recovery, so that the data tiering layout can be maintained in the main storage region after the data recovery to maintain the storage service performance, and thus a seamless storage service can be provided to improve the user experience.

Figure 9:
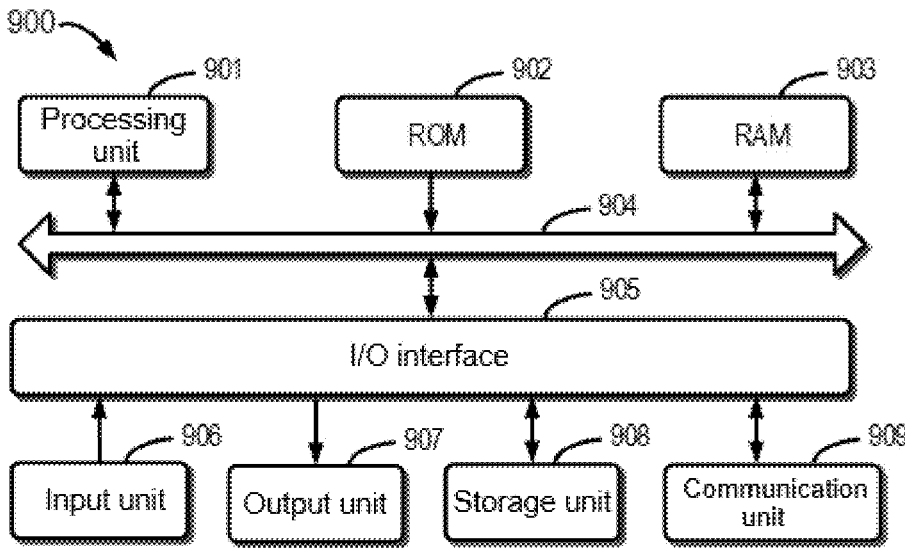
FIG. 9 is a schematic block diagram of an example device adapted to implement embodiments of the present disclosure.

FIG. 9 illustrates a schematic block diagram of an example device 900 which can be used to implement embodiments of the present disclosure. The computing device in the storage system 100 in FIG. 1 can be implemented using the device 900. As shown in the figure, the device 900 includes a processing unit 901 which can perform various appropriate actions and processing according to computer program instructions stored in a read-only memory (ROM) 902 or computer program instructions loaded from a storage unit 508 to a random access memory (RAM) 903. Various programs and data required for the operations of the device 900 may also be stored in the RAM

903. The CPU 901, the ROM 902, and the RAM 903 are connected to one another through a bus 1104. An input/output (I/O) interface 905 is also connected to the bus 904.

Multiple components in the device 900 are connected to the I/O interface 905 and include: an input unit 906, such as a keyboard and a mouse; an output unit 907, such as various types of displays and speakers; a memory page 908, such as a disk or an optical disc; and a communication unit 909, such as a network card, a modem, and a wireless communication transceiver. The communication unit 909 allows the device 900 to exchange information/data with other devices via a computer network, such as the Internet, and/or various telecommunication networks.

The various processes and processing described above, such as the methods 200, 500, and 700, may be performed by the processing unit 901. For example, in some embodiments, the methods 200, 500, and 700 may be implemented as a computer software program that is tangibly included in a machine-readable medium such as the storage unit 908. In some embodiments, part or all of the computer program may be loaded and/or installed onto the device 900 via the ROM 902 and/or the communication unit 909. When the computer program is loaded into the RAM 903 and executed by the CPU 901, one or more actions of the methods 200, 500, and 700 described above can be performed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that can maintain and store instructions to be used by an instruction execution device. For example, the computer-readable storage medium may be, but is not limited to, an electric storage device, a magnetic storage device, an optical storage device, an electromagnetic storage device, a semi-conductor storage device, or any suitable combination thereof. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, such as a punch card or a raised structure in a groove with instructions stored thereon, and any suitable combination thereof. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device through a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in various computing/processing devices.

Computer program instructions for performing the operations of the present disclosure may be assembly instructions, Instruction Set Architecture (ISA) instructions, machine instructions, machine-related instructions, microcode, firmware instructions, state setting data, or source code or object code written in any combination of one or more programming languages, including object-oriented programming languages such as Smalltalk and C++, and conventional procedural programming languages such as "C" language or the like. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (e.g., connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit can execute the computer-readable program instructions so as to implement various aspects of the present disclosure.

Various aspects of the present disclosure are described herein with reference to flow charts and/or block diagrams of the method, apparatus (system), and computer program product according to embodiments of the present disclosure. It should be understood that each block of the flow charts and/or the block diagrams and combinations of blocks in the flow charts and/or the block diagrams can be implemented by the computer-readable program instructions.

These computer-readable program instructions may be provided to a processing unit of a general-purpose computer, a special-purpose computer, or other programmable data processing apparatuses to produce a machine, such that these instructions, when executed by the processing unit of the computer or other programmable data processing apparatuses, produce means for implementing the functions/acts specified in one or more blocks in the flow charts and/or the block diagrams. These computer-readable program instructions may also be stored in a computer-readable storage medium, and cause a computer, a programmable data processing apparatus, and/or other devices to function in a particular manner, so that the computer-readable medium having the instructions stored thereon includes an article of manufacture including instructions for implementing various aspects of the functions/acts specified in one or more blocks in the flow charts and/or the block diagrams.

The computer-readable program instructions may also be loaded onto a computer, other programmable data processing apparatuses, or other devices, such that a series of operational steps are performed on the computer, other programmable data processing apparatuses, or other devices to produce a computer-implemented process, such that the instructions executed on the computer, other programmable data processing apparatuses, or other devices implement the functions/actions specified in one or more blocks in the flow charts and/or the block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on the functions involved. It should be further noted that each block in the block diagrams and/or flow charts as well as a combination of blocks in the block diagrams and/or flow charts may be implemented using a dedicated hardware-based system that executes specified functions or actions, or using a combination of dedicated hardware and computer instructions.

The embodiments of the present disclosure have been described above. The above description is illustrative, rather than exhaustive, and is not limited to the disclosed various embodiments. Numerous modifications and alterations are apparent to those of ordinary skill in the art without departing from the scope and spirit of the illustrated embodiments. The selection of terms as used herein is intended to best explain the principles and practical applications of the various embodiments or technical improvements to technologies on the market, or to enable other those of ordinary skill in the art to understand the embodiments disclosed here.

The invention claimed is:

1. A method for backing up data, comprising:
determining a storage tier for storing the data;
determining a data access frequency of the data, wherein the data access frequency indicates a frequency at which the data is accessed and determining the data access frequency includes:
determining a region access frequency, the region access frequency indicating a frequency at which a storage region storing the data is accessed,
determining a first number of data blocks in the storage region, and
determining a data block access frequency based on the region access frequency and the first number of the data blocks, wherein the data block access frequency indicates a frequency at which the data blocks are accessed;
generating metadata based on information of the storage tier and the data access frequency of the data; and
sending the metadata and the data to a backup server.

2. The method according to claim 1, further comprising:
storing the data in the corresponding storage tier according to the frequency at which the data is accessed.

3. The method according to claim 1, wherein determining the data access frequency further comprises:
determining a second number of data blocks included in the data; and
determining the data access frequency based on the second number and the data block access frequency.

4. The method according to claim 1, wherein the storage region storing the data comprises a stripe.

5. The method according to claim 4, wherein the stripe corresponds to the storage tier storing the data.

6. The method according to claim 1, further comprising:
converting the data and the metadata into a data packet; and sending the data packet to a file system layer to set the metadata in a property file via the file system layer; and sending the property file and the data to the backup server, wherein the metadata comprises the information of the storage tier and the data access frequency.

7. The method according to claim 1, wherein the information of the storage tier is represented by a bit value, and wherein the information of the storage tier and the data access frequency are associated with an identifier of the data.

8. An electronic device, comprising:

at least one processor; and at least one memory coupled to the at least one processor and storing instructions to be executed by the at least one processor, the instructions, when executed by the at least one processor, cause the electronic device to:

determine a storage tier for storing data;

determine a data access frequency of the data, wherein the data access frequency indicates a frequency at which the data is accessed and to determine the data access frequency of the data the electronic device is caused to:

determine a region access frequency, the region access frequency indicating a frequency at which a storage region storing the data is accessed, determine a first number of data blocks in the storage region, and determine a data block access frequency based on the region access frequency and the first number of the data blocks, wherein the data block access frequency indicates a frequency at which the data blocks are accessed;

generate metadata based on information of the storage tier and the data access frequency of the data; and send the metadata and the data to a backup server.

9. The electronic device according to claim 8, comprising further instructions that when executed by the at least one processor, cause the electronic device to:

store the data in the corresponding storage tier according to the frequency at which the data is accessed.

10. The electronic device according to claim 8, wherein determining the data access frequency further comprises:

determine a second number of data blocks included in the data; and determine the data access frequency based on the second number and the data block access frequency.

11. The electronic device according to claim 8, wherein the storage region storing the data comprises a stripe.

12. The electronic device according to claim 11, wherein the stripe corresponds to the storage tier storing the data.

13. The electronic device according to claim 8, comprising further instructions that when executed by the at least one processor, cause the electronic device to:

convert the data and the metadata into a data packet; and send the data packet to a file system layer to set the metadata in a property file via the file system layer.

14. The electronic device according to claim 13, comprising further instructions that when executed by the at least one processor, cause the electronic device to:

send the property file and the data to the backup server, wherein the metadata comprises the information of the storage tier and the data access frequency.

15. The electronic device according to claim 8, wherein the information of the storage tier is represented by a bit value and wherein the information of the storage tier and the data access frequency are associated with an identifier of the data.

16. A non-transitory computer-readable medium storing machine-executable instructions, the machine-executable instructions, when executed, cause a machine to:

determine a storage tier for storing data;

determine a data access frequency of the data, wherein the data access frequency indicates a frequency at which the data is accessed and to determine the data access frequency of the data the machine is caused to:

determine a region access frequency, the region access frequency indicating a frequency at which a storage region storing the data is accessed, determine a first number of data blocks in the storage region, and determine a data block access frequency based on the region access frequency and the first number of the data blocks, wherein the data block access frequency indicates a frequency at which the data blocks are accessed;

generate metadata based on information of the storage tier and the data access frequency of the data; and send the metadata and the data to a backup server.

17. The non-transitory computer-readable medium according to claim 16, comprising further instructions that when executed cause the machine to:

store the data in the corresponding storage tier according to the frequency at which the data is accessed.

18. The non-transitory computer-readable medium according to claim 16, wherein to determine the data access frequency the machine is further caused to:

determine a second number of data blocks included in the data; and determine the data access frequency based on the second number and the data block access frequency.

19. The non-transitory computer-readable medium according to claim 16, wherein the storage region storing the data comprises a stripe.

20. The non-transitory computer-readable medium according to claim 19, wherein the stripe corresponds to the storage tier storing the data.

* * * * *